(12) United States Patent
Lartey

(10) Patent No.: US 10,863,669 B2
(45) Date of Patent: Dec. 15, 2020

(54) LAWN MOWING ASSEMBLY

(71) Applicant: Victor Lartey, Rochester, MN (US)

(72) Inventor: Victor Lartey, Rochester, MN (US)

(*) Notice: Subject to any disclaimer, the term of this patent is extended or adjusted under 35 U.S.C. 154(b) by 442 days.

(21) Appl. No.: 15/873,383

(22) Filed: Jan. 17, 2018

(65) Prior Publication Data
US 2019/0216015 A1 Jul. 18, 2019

(51) Int. Cl.
*A01D 34/73* (2006.01)
*A01D 34/82* (2006.01)
*A01D 34/81* (2006.01)
*A01D 34/66* (2006.01)
*A01D 101/00* (2006.01)

(52) U.S. Cl.
CPC ......... *A01D 34/733* (2013.01); *A01D 34/661* (2013.01); *A01D 34/81* (2013.01); *A01D 34/82* (2013.01); *A01D 2101/00* (2013.01)

(58) Field of Classification Search
USPC ........... 56/295, 320.1, 15.2, 14.7, 14.9, 17.2
See application file for complete search history.

(56) References Cited

U.S. PATENT DOCUMENTS

| | | | |
|---|---|---|---|
| 3,553,946 A | 1/1971 | Taylor | |
| 3,699,752 A * | 10/1972 | Dandl | A01D 34/661 56/13.6 |
| 4,802,327 A | 2/1989 | Roberts | |
| 5,042,236 A * | 8/1991 | Lamusga | A01D 75/30 56/12.7 |
| 5,069,022 A * | 12/1991 | Vandermark | A01D 75/30 56/15.5 |
| 5,085,042 A * | 2/1992 | Lansdowne | A01D 75/28 280/6.154 |
| 5,161,353 A * | 11/1992 | Bergkamp | A01D 75/28 280/6.154 |
| 5,483,789 A * | 1/1996 | Gummerson | A01D 34/863 56/15.5 |
| 5,771,672 A * | 6/1998 | Gummerson | A01D 34/64 56/15.4 |
| 6,032,441 A * | 3/2000 | Gust | A01D 75/30 56/7 |
| 6,223,510 B1 * | 5/2001 | Gillins | A01D 34/64 56/15.1 |
| 6,484,481 B1 * | 11/2002 | Langworthy | A01D 75/30 56/6 |
| 6,591,592 B1 | 7/2003 | Krimminger | |
| 6,860,093 B2 | 3/2005 | Scordilis | |
| 7,654,065 B2 * | 2/2010 | Phillips | A01D 75/306 56/15.1 |
| 8,713,904 B1 | 5/2014 | Goudy | |
| 2005/0193700 A1 | 9/2005 | Bares | |
| 2007/0101693 A1 * | 5/2007 | Korthals | A01D 34/66 56/320.1 |
| 2008/0196380 A1 * | 8/2008 | Link | A01D 75/306 56/320.1 |
| 2009/0249758 A1 | 10/2009 | Weeden | |

* cited by examiner

*Primary Examiner* — Thomas B Will
*Assistant Examiner* — Mai T Nguyen

(57) ABSTRACT

A lawn mowing assembly having selectively extendable mowing decks includes a tractor that is driven on a lawn. A pair of mowing decks is each movably coupled to the tractor. Each of the mowing decks is positioned between a retracted position and an extended position. An extension unit is coupled to the tractor and the extension unit is coupled to each of the mowing decks. The extension unit urges the mowing decks between the retracted position and the extended position.

14 Claims, 5 Drawing Sheets

US 10,863,669 B2

LAWN MOWING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to mowing devices and more particularly pertains to a new mowing device having selectively extendable mowing decks.

BRIEF SUMMARY OF THE INVENTION

An embodiment of the disclosure meets the needs presented above by generally comprising a tractor that is driven on a lawn. A pair of mowing decks is each movably coupled to the tractor. Each of the mowing decks is positioned between a retracted position and an extended position. An extension unit is coupled to the tractor and the extension unit is coupled to each of the mowing decks. The extension unit urges the mowing decks between the retracted position and the extended position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
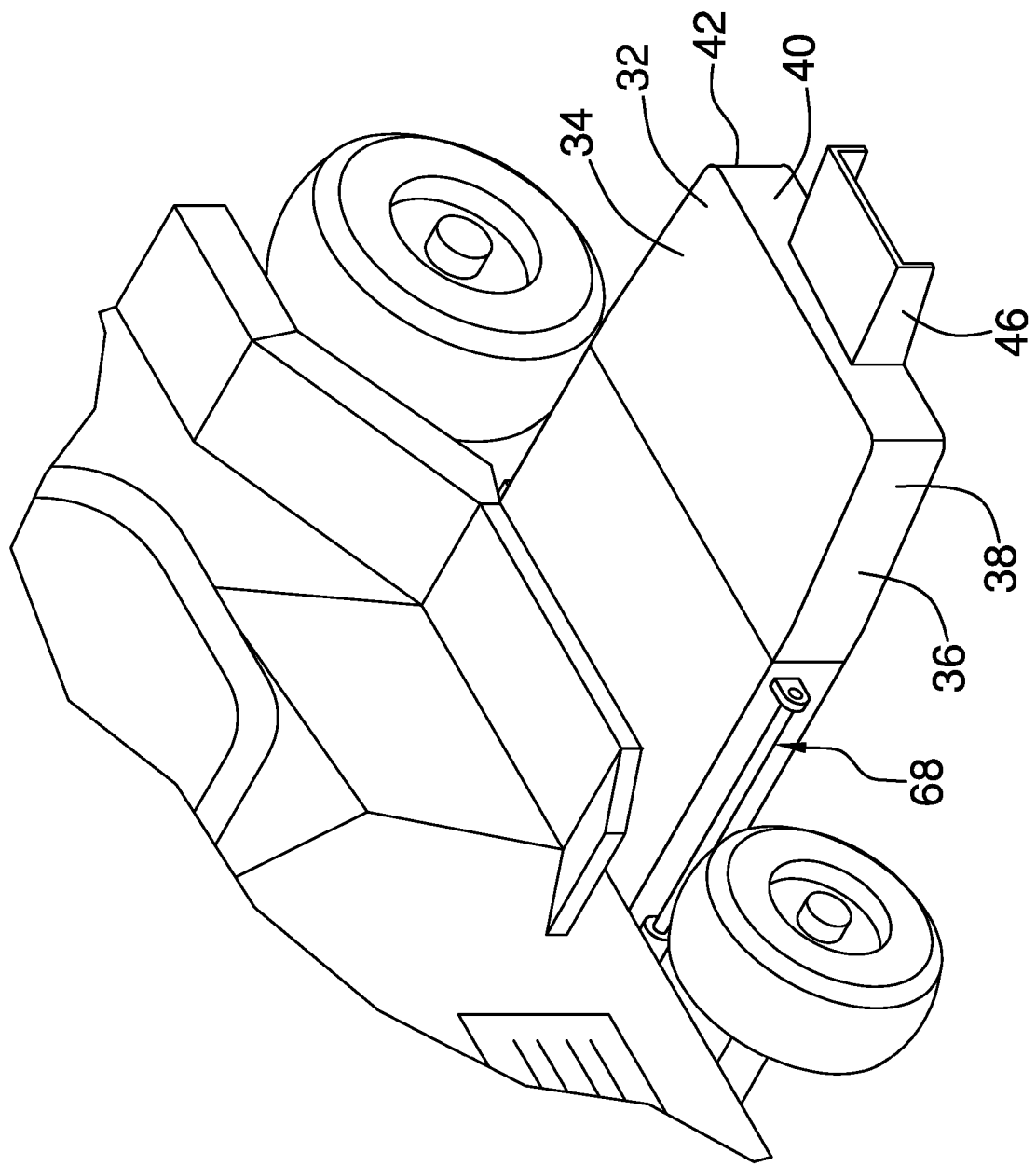
FIG. 1 is a front perspective view of a lawn mowing assembly according to an embodiment of the disclosure.
Figure 2:
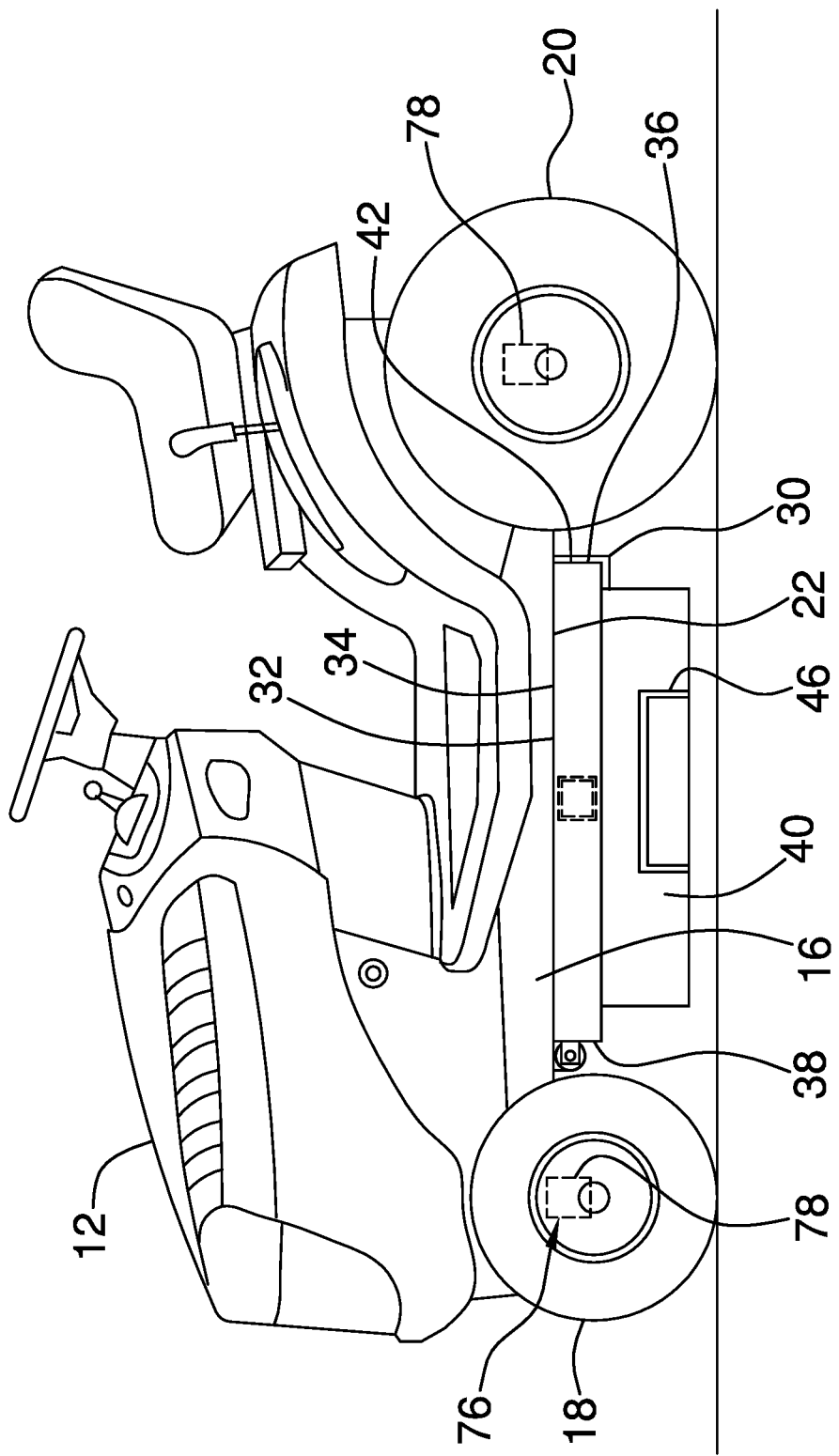
FIG. 2 is a left side phantom view of an embodiment of the disclosure.
Figure 3:
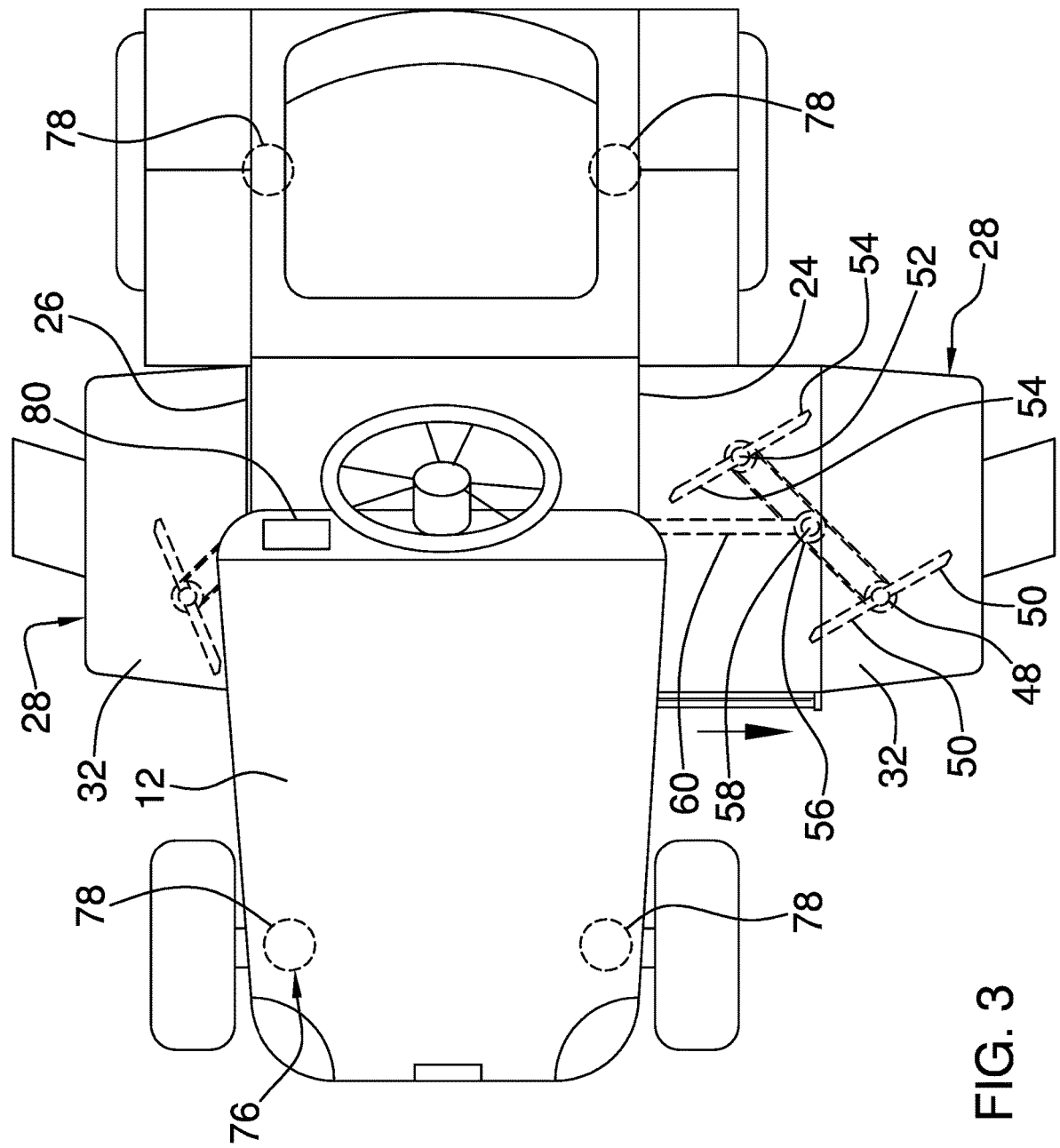
FIG. 3 is a top phantom view of an embodiment of the disclosure.
Figure 4:
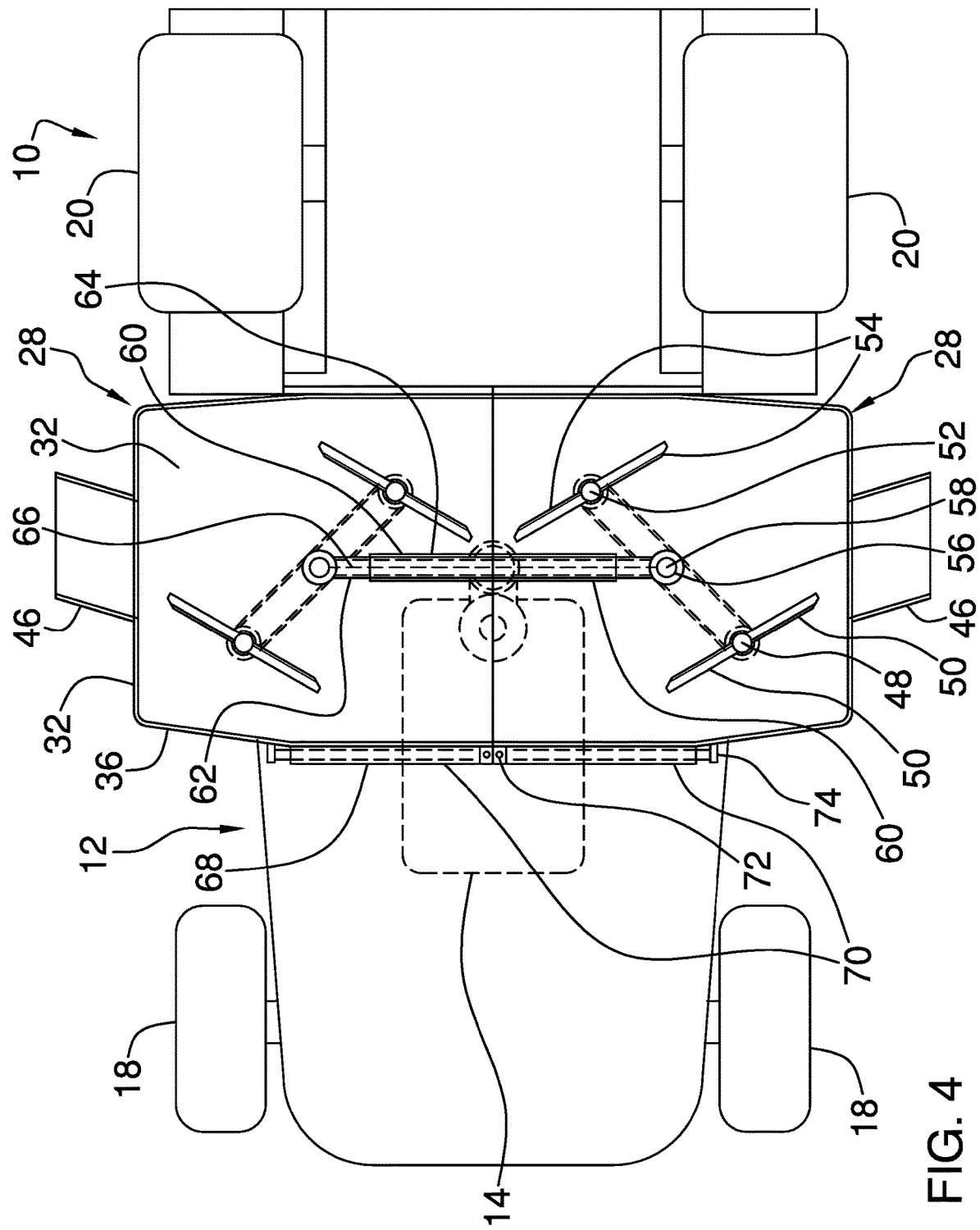
FIG. 4 is a bottom phantom view of an embodiment of the disclosure.
Figure 5:
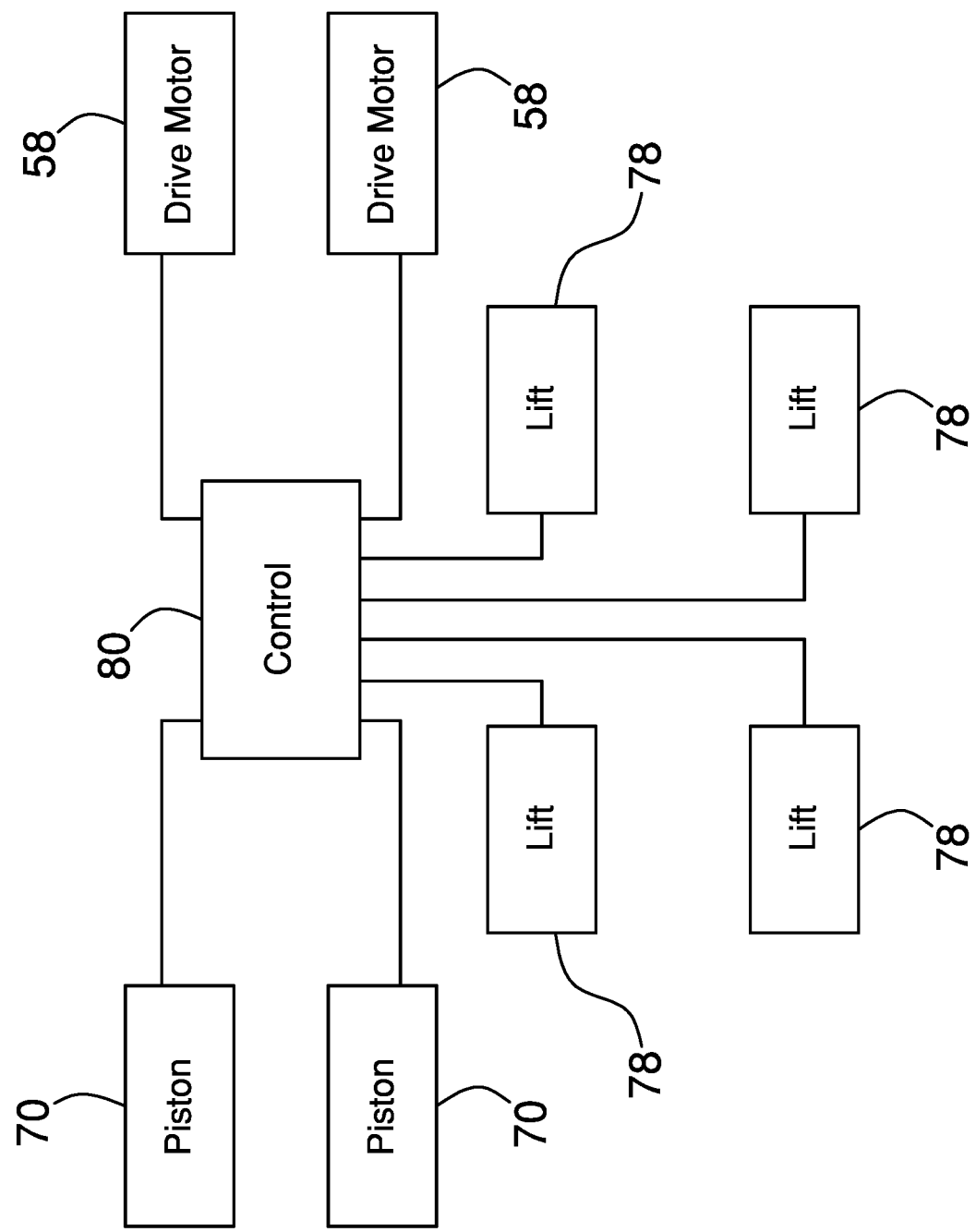
FIG. 5 is a schematic view of an embodiment of the disclosure.

With reference now to the drawings, and in particular to FIGS. 1 through 5 thereof, a new mowing device embodying the principles and concepts of an embodiment of the disclosure and generally designated by the reference numeral 10 will be described.

As best illustrated in FIGS. 1 through 5, the lawn mowing assembly 10 generally comprises a tractor 12 that is driven on a lawn. The tractor 12 includes a primary motor 14, a frame 16, a set of front wheels 18 and a set of rear wheels 20. The frame 16 has a bottom side 22, a first lateral side 24 and a second lateral side 26 and each of the front wheels 18 and the rear wheels 20 is positioned on the bottom side 22. The tractor 12 may be a riding lawn mower or the like and the primary motor 14 may be an internal combustion engine that powers the set of rear wheels 20.

A pair of mowing decks 28 is provided and each of the mowing decks 28 is movably coupled to the tractor 12. Each of the mowing decks 28 is positioned in a retracted position having each of the mowing decks 28 being positioned beneath the tractor 12. Thus, the mowing decks 28 mow grass beneath the tractor 12. Each of the mowing decks 28 is selectively positioned in an extended position having each of the mowing decks 28 extending laterally away from the tractor 12. Thus, each of the mowing decks 28 mows grass beside the tractor 12.

Each of the mowing decks 28 comprises a track 30 that is coupled to the bottom side 22 of the frame 16. The track 30 corresponding to each of the mowing decks 28 extends between a center of the tractor 12 and an associated one of the first lateral side 24 and the second lateral side 26 of the frame 16. Additionally, the track 30 is positioned between the rear wheels 20 and the front wheels 18. The track 30 may be mechanical track of any conventional design that facilitates linear motion along the bottom side 22 of the frame 16.

Each of the mowing decks 28 includes a shield 32 that has a top wall 34 and perimeter wall 36 extending downwardly therefrom. The perimeter wall 36 has a front side 38, an outward side 40 and a back side 42. The back side 42 slidably engages the track 30 such that the shield 32 is positionable between a first position and a second position. The top wall 34 is spaced from the bottom side 22 of the frame 16 and the top wall 34 lies on a horizontal plane. A chute 46 is extends through and extends away from the outward side 40 of the perimeter wall 36 of the shield 32 to direct clippings outwardly from the shield 32.

Each of the mowing decks 28 includes a first shaft 48 and a pair of first blades 50. The first shaft 48 is rotatably coupled to the top wall 34 of the shield 32 and the first shaft 48 extends downwardly from the top wall 34. The pair of first blades 50 is coupled to and extends laterally away from the first shaft 48. Each of the first blades 50 cut grass and other plant life when the first shaft 48 is rotated. Moreover, each of the first blades 50 may be lawn mower blades of any conventional design.

Each of the mowing decks 28 includes a second shaft 52 and a pair of second blades 54. The second shaft 52 is rotatably coupled to the top wall 34 of the shield 32 and the second shaft 52 extends downwardly from the top wall 34. The second shaft 52 is spaced from the first shaft 48. The pair of second blades 54 is coupled to and extends laterally away from the second shaft 52. Each of the second blades 54 cuts grass and other plant life when the second shaft 52 is rotated.

Each of the mowing decks 28 includes a drive 56 that is coupled to the top wall 34 of the shield 32. The drive 56 is in mechanical communication with each of the first shaft 48 and the second shaft 52 such that the drive 56 rotates each of the first shaft 48 and the second shaft 52. The drive 56 may be a gear, a pulley and any other type of rotational drive 56 that is capable of transferring rotational torque to each of the first shaft 48 and the second shaft 52. Additionally, the drive 56 may include a corresponding chain or belt for engaging the first shaft 48 and the second shaft 52.

Each of the mowing decks 28 includes a drive motor 58 that is coupled to the top wall 34 of the shield 32. The drive motor 58 is coupled to the drive 56 such that the drive motor 58 rotates the drive 56 when the drive motor 58 is turned on. The drive motor 58 may be a DC electric motor or the like. A conduit 60 is coupled to the top wall 34 of the shield 32 and the conduit 60 extends between the drive motor 58 and the frame 16 of the tractor 12. The conduit 60 has a first section 62 that is slidably coupled to a second section 64 such that the conduit 60 has a telescopically adjustable length. A conductor 66 is electrically coupled to the drive motor 58 and extends through the conduit 60.

An extension unit 68 is coupled to the tractor 12 and the extension unit 68 is coupled to each of the mowing decks 28. The extension unit 68 urges the mowing decks 28 between the retracted position and the extended position. The extension unit 68 comprises a pair of pistons 70 and each of the pistons 70 has a first end 72 and a second end 74. The first end 72 of each of the pistons 70 is coupled to the bottom side 22 of the frame 16.

The second end 74 of each of the pistons 70 is coupled to the front side 38 of the perimeter wall 36 of the shield 32 corresponding to the associated mowing deck 28. Each of the pistons 70 urges the shield 32 corresponding to the associated mowing deck 28 outwardly from the tractor 12 when the pistons 70 are extended. Each of the pistons 70 urges the shield 32 corresponding to the associating mowing deck 28 to retract beneath the tractor 12 when the pistons 70 are retracted. Moreover, each of the pistons 70 may be an electrical linear actuator or the like.

A lifting unit 76 is coupled between the frame 16 and each of the set of front wheels 18 and the set of rear wheels 20. The lifting unit 76 selectively lifts the frame 16 upwardly from the set of front wheels 18 and the set of rear wheels 20. In this way the lifting unit 76 increases clearance between the mowing decks 28 and ground for moving the mowing decks 28 between the retracted and extended positions. The lifting unit 76 selectively lowers the frame 16 onto to the set of front wheels 18 and the set of rear wheels 20. Thus, the lifting unit 76 positions the pair of mowing decks 28 for mowing. The lifting unit 76 comprises a plurality of lifts 78 and each of the lifts 78 is coupled between the bottom side 22 of the frame 16 and an associated one of the front wheels 18 and the rear wheels 20. Each of the lifts 78 may be an electrical linear actuator or the like.

A control 80 is provided and the control 80 is coupled to the tractor 12. The conductor 66 corresponding to each of the mowing decks 28 is electrically coupled to the control 80. In this way the control 80 is electrically coupled to drive motor 58 corresponding to each of the mowing decks 28 and the control 80 selectively turns the drive motor 58 on and off. Additionally, the control 80 is electrically coupled to each of the pistons 70 corresponding to the extension unit 68. The control 80 selectively extends and retracts each of the pistons 70.

The control 80 is electrically coupled to each of the lifts 78 corresponding to the lifting unit 76. Thus, the control 80 selectively lifts and lowers the frame 16 with respect to the set of front wheels 18 and the set of rear wheels 20. The control 80 is electrically coupled to the primary motor 14 on the tractor 12 as a power source. Additionally, the control 80 may comprise buttons, switches, levers and any other conventional type of electronic control 80.

In use, the tractor 12 is driven for mowing the lawn. The lifting unit 76 is actuated to lift the frame 16 and a selected one of the mowing decks 28 is moved between the retracted position and the extended position. In this way the mowing decks 28 are inhibited from striking the ground or an object during extension and retraction. Additionally, each of the mowing decks 28 may be moved in tandem or individually. The lifting unit 76 is actuated to lower the frame 16 thereby positioning the mowing decks 28 for mowing when the mowing decks 28 are finished being extended or retracted. In this way the mowing decks 28 facilitate areas of a lawn to be mowed that would otherwise be inaccessible to traditional lawn mowers such as tight inside corners or the like.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A lawn mowing assembly having a pair of extendable decks wherein said assembly is configured to mow a lawn, said assembly comprising:

a tractor being configured to be driven on a lawn, said tractor including a primary motor, a frame, a set of front wheels and a set of rear wheels, said frame having a bottom side, first lateral side and a second lateral side, each of said front wheels and said rear wheels being positioned on said bottom side;

a pair of mowing decks, each of said mowing decks being movably coupled to said tractor, each of said mowing decks being positioned in a retracted position having each of said mowing decks being positioned beneath said tractor, each of said mowing decks being selectively positioned in an extended position having each of said mowing decks extending laterally away from said tractor;

an extension unit being coupled to said tractor, said extension unit being coupled to each of said mowing decks, said extension unit urging said mowing decks between said retracted position and said extended position; and a lifting unit being coupled between said frame and each of said set of front wheels and said set of rear wheels, said lifting unit selectively lifting said frame upwardly from said set of front wheels and said set of rear wheels, said lifting unit selectively lowering said frame onto to said set of front wheels and said set of rear wheels.

2. The assembly according to claim 1, wherein each of said mowing decks comprises a track being coupled to said bottom side of said frame, said track corresponding to each of said mowing decks extending between a center of said tractor and an associated one of said first lateral side and said second lateral side of said frame, said track being positioned between said rear wheels and said front wheels.

3. The assembly according to claim 1, wherein said lifting unit comprises a plurality of lifts, each of said lifts being coupled between said bottom side of said frame and an associated one of said front wheels and said rear wheels.

4. A lawn mowing assembly having a pair of extendable decks wherein said assembly is configured to mow a lawn, said assembly comprising:

a tractor being configured to be driven on a lawn, said tractor including a primary motor, a frame, a set of front wheels and a set of rear wheels, said frame having a bottom side, first lateral side and a second lateral side, each of said front wheels and said rear wheels being positioned on said bottom side;

a pair of mowing decks, each of said mowing decks being movably coupled to said tractor, each of said mowing decks being positioned in a retracted position having each of said mowing decks being positioned beneath said tractor, each of said mowing decks being selectively positioned in an extended position having each of said mowing decks extending laterally away from said tractor, each of said mowing decks comprising a track being coupled to said bottom side of said frame, said track corresponding to each of said mowing decks extending between a center of said tractor and an associated one of said first lateral side and said second lateral side of said frame, said track being positioned between said rear wheels and said front wheels;

an extension unit being coupled to said tractor, said extension unit being coupled to each of said mowing decks, said extension unit urging said mowing decks between said retracted position and said extended position; and a shield having a top wall and perimeter wall extending downwardly therefrom, said perimeter wall having a front side, and outward side and a back side, said back side slidably engaging said track such that said shield is positionable between a first position and a second position.

5. The assembly according to claim 4, further comprising a chute being coupled to and extending away from said outward side of said perimeter wall of said shield wherein said chute is configured to direct clippings outwardly from said shield.

6. The assembly according to claim 4, further comprising a first shaft being rotatably coupled to said top wall of said shield, said first shaft extending downwardly from said top wall.

7. The assembly according to claim 6, further comprising a second shaft being rotatably coupled to said top wall of said shield, said second shaft extending downwardly from said top wall, said second shaft being spaced from said first shaft.

8. The assembly according to claim 7, further comprising a pair of first blades, each of said first blades being coupled to and extending laterally away from said first shaft wherein each of said first blades is configured to cut grass when said first shaft is rotated.

9. The assembly according to claim 8, further comprising a pair of second blades, each of said second blades being coupled to and extending laterally away from said second shaft wherein each of said second blades is configured to cut grass when said second shaft is rotated.

10. The assembly according to claim 9, further comprising a drive being coupled to said top wall of said shield, said drive being in mechanical communication with each of said first shaft and said second shaft such that said drive rotates each of said first shaft and said second shaft.

11. The assembly according to claim 10, further comprising a drive motor being coupled to said top wall of said shield, said drive motor being coupled to said drive such that said drive motor rotates said drive when said drive motor is turned on.

12. The assembly according to claim 11, further comprising a conduit being coupled to said top wall of said shield, said conduit extending between said drive motor and said frame of said tractor, said conduit having a first section being slidably coupled to a second section such that said conduit has a telescopically adjustable length.

13. The assembly according to claim 4, wherein said extension unit comprises a pair of pistons, each of said pistons having a first end and a second end, said first end of each of said pistons being coupled to said bottom side of said frame, said second end of each of said pistons being coupled to said front side of said perimeter wall of said shield corresponding to said associated mowing deck, each of said pistons urging said shield corresponding to said associated mowing deck outwardly from said tractor when said pistons are extended, each of said pistons urging said shield corresponding to said associating mowing deck to retract beneath said tractor when said pistons are retracted.

14. A lawn mowing assembly having a pair of extendable decks wherein said assembly is configured to mow a lawn, said assembly comprising:

a tractor being configured to be driven on a lawn, said tractor including a primary motor, a frame, a set of front wheels and a set of rear wheels, said frame having a bottom side, first lateral side and a second lateral side, each of said front wheels and said rear wheels being positioned on said bottom side;

a pair of mowing decks, each of said mowing decks being movably coupled to said tractor, each of said mowing decks being positioned in a retracted position having each of said mowing decks being positioned beneath said tractor, each of said mowing decks being selectively positioned in an extended position having each of said mowing decks extending laterally away from said tractor, each of said mowing decks comprising:

a track being coupled to said bottom side of said frame, said track corresponding to each of said mowing decks extending between a center of said tractor and an associated one of said first lateral side and said second lateral side of said frame, said track being positioned between said rear wheels and said front wheels;

a shield having a top wall and perimeter wall extending downwardly therefrom, said perimeter wall having a front side, and outward side and a back side, said backside slidably engaging said track such that said shield is positionable between a first position and a second position;

a chute being coupled to and extending away from said outward side of said perimeter wall of said shield wherein said chute is configured to direct clippings outwardly from said shield;

a first shaft being rotatably coupled to said top wall of said shield, said first shaft extending downwardly from said top wall;

a second shaft being rotatably coupled to said top wall of said shield, said second shaft extending downwardly from said top wall, said second shaft being spaced from said first shaft;

a pair of first blades, each of said first blades being coupled to and extending laterally away from said first shaft wherein each of said first blades is configured to cut grass when said first shaft is rotated;

a pair of second blades, each of said second blades being coupled to and extending laterally away from said second shaft wherein each of said second blades is configured to cut grass when said second shaft is rotated;

a drive being coupled to said top wall of said shield, said drive being in mechanical communication with each of said first shaft and said second shaft such that said drive rotates each of said first shaft and said second shaft;

a drive motor being coupled to said top wall of said shield, said drive motor being coupled to said drive such that said drive motor rotates said drive when said drive motor is turned on; and a conduit being coupled to said top wall of said shield, said conduit extending between said drive motor and said frame of said tractor, said conduit having a first section being slidably coupled to a second section such that said conduit has a telescopically adjustable length;

an extension unit being coupled to said tractor, said extension unit being coupled to each of said mowing decks, said extension unit urging said mowing decks between said retracted position and said extended position, said extension unit comprising a pair of pistons, each of said pistons having a first end and a second end, said first end of each of said pistons being coupled to said bottom side of said frame, said second end of each of said pistons being coupled to said front side of said perimeter wall of said shield corresponding to said associated mowing deck, each of said pistons urging said shield corresponding to said associated mowing deck outwardly from said tractor when said pistons are extended, each of said pistons urging said shield corresponding to said associating mowing deck to retract beneath said tractor when said pistons are retracted;

a lifting unit being coupled between said frame and each of said set of front wheels and said set of rear wheels, said lifting unit selectively lifting said frame upwardly from said set of front wheels and said set of rear wheels, said lifting unit selectively lowering said frame onto to said set of front wheels and said set of rear wheels, said lifting unit comprising a plurality of lifts, each of said lifts being coupled between said bottom side of said frame and an associated one of said front wheels and said rear wheels; and a control being coupled to said tractor, said control being electrically coupled to drive motor corresponding to each of said mowing decks, said control selectively turning said drive motor on and off, said control being electrically coupled to each of said pistons corresponding to said extension unit, said control selectively extending and retracting each of said pistons, said control being electrically coupled to each of said lifts corresponding to said lifting unit, said control selectively lifting and lowering said frame with respect to said set of front wheels and said set of rear wheels.

\* \* \* \* \*